United States Patent
Liu et al.

(10) Patent No.: US 7,684,340 B2
(45) Date of Patent: Mar. 23, 2010

(54) PACKET FORWARDING APPARATUS AND METHOD THEREOF

(75) Inventors: Chun-Feng Liu, Taipei (TW); Jin-Ru Chen, Tai-Chung (TW); Yi-Lun Chen, Chang-Hua Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 443 days.

(21) Appl. No.: 11/535,487

(22) Filed: Sep. 27, 2006

(65) Prior Publication Data

US 2007/0071023 A1      Mar. 29, 2007

(30) Foreign Application Priority Data

Sep. 28, 2005   (TW) .............................. 94133761 A

(51) Int. Cl.
*H04L 12/26* (2006.01)
*H04L 12/56* (2006.01)

(52) U.S. Cl. ....................................... 370/249; 370/463

(58) Field of Classification Search ......... 370/216–228, 370/400, 401
See application file for complete search history.

(56) References Cited

U.S. PATENT DOCUMENTS

| 6,173,333 | B1 * | 1/2001 | Jolitz et al. ................. 709/240 |
| 7,088,716 | B2 * | 8/2006 | Sugai et al. ................. 370/392 |
| 2002/0006137 | A1 * | 1/2002 | Rabenko et al. ............. 370/466 |
| 2004/0213237 | A1 * | 10/2004 | Yasue et al. ................. 370/392 |
| 2005/0089038 | A1 | 4/2005 | Sugai |

\* cited by examiner

*Primary Examiner*—Gregory B Sefcheck
*Assistant Examiner*—Nima Mahmoudzadeh
(74) *Attorney, Agent, or Firm*—Thomas, Kayden, Horstemeyer & Risley

(57) ABSTRACT

A packet forwarding device is disclosed. The packet forwarding device includes: a transmission interface, coupled to a second network device; a processing unit, coupled to a first network device; a forwarding unit, coupled between the transmission interface and the processing unit; and an interface loop-back, coupled between the forwarding unit and the processing unit.

12 Claims, 6 Drawing Sheets

PACKET FORWARDING APPARATUS AND METHOD THEREOF

BACKGROUND OF THE INVENTION

1. Field of the Invention

The invention relates to a network system, and more particularly, to a packet forwarding device and method thereof.

2. Description of the Prior Art

As computer network's progress, network packet forwarding devices (such as switch, router, gateway) have become necessary devices. Please refer to FIG. 1, which is a diagram of a conventional switch 100. As shown in FIG. 1, the switch 100 comprises a processor 110 (e.g. a normal CPU) coupled to an external network device 140; a forwarding unit 120; and a plurality of physical interfaces 130. Generally speaking, the forwarding unit 120 is implemented by an ASIC and is coupled to the processor 110 through a bus. The conventional switch 100 is utilized to forward a packet from the external network device 140 to a plurality of physical interfaces 130, or to forward a packet from one of the physical interfaces 130 to the external network device 140.

The processor 110 utilizes the bus to communicate with the forwarding unit 120 and to transfer the packet to the forwarding unit 120. Therefore, if the processor 110 and the forwarding unit 120 have to cooperate to forward a packet, a novel communication protocol between the processor 110 and the forwarding unit 120 should be developed. Obviously, this increases the circuit complexity of the conventional switch 100 and also increases the rates of mistake occurrence of the entire system. This is especially true for some specific works (for example, IGMP snooping or adding a PPTP/L2TP header into the packet when the packet has to be forwarded to the wireless network interface), as the forwarding unit 120 cannot independently complete such works. Instead, the forwarding unit 120 has to cooperate with the processor 110 to complete the specific works. Therefore, a method and related device is needed to allow the processor 110 and the forwarding unit 120 to deal with the packet forwarding works together.

SUMMARY OF THE INVENTION

It is therefore one of the objectives of the claimed invention to provide a packet forwarding device and related method thereof, to solve the above-mentioned problem.

According to an exemplary embodiment of the claimed invention, a packet forwarding device comprises: a transmission interface, configured to couple to a first network device; a processing unit, coupled to the transmission interface; a forwarding unit, coupled between the transmission interface and the processing unit, wherein the processing unit communicates with the forwarding unit via a bus; and a loop, coupled between the forwarding unit and the processing unit.

According to an exemplary embodiment of the claimed invention, a method for forwarding packet comprises: forming a loop between a transmitter of an interface and a receiver of the interface; receiving a packet from a first network device; outputting the packet to the loop; receiving the packet from the loop; and forwarding the packet to a second network device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
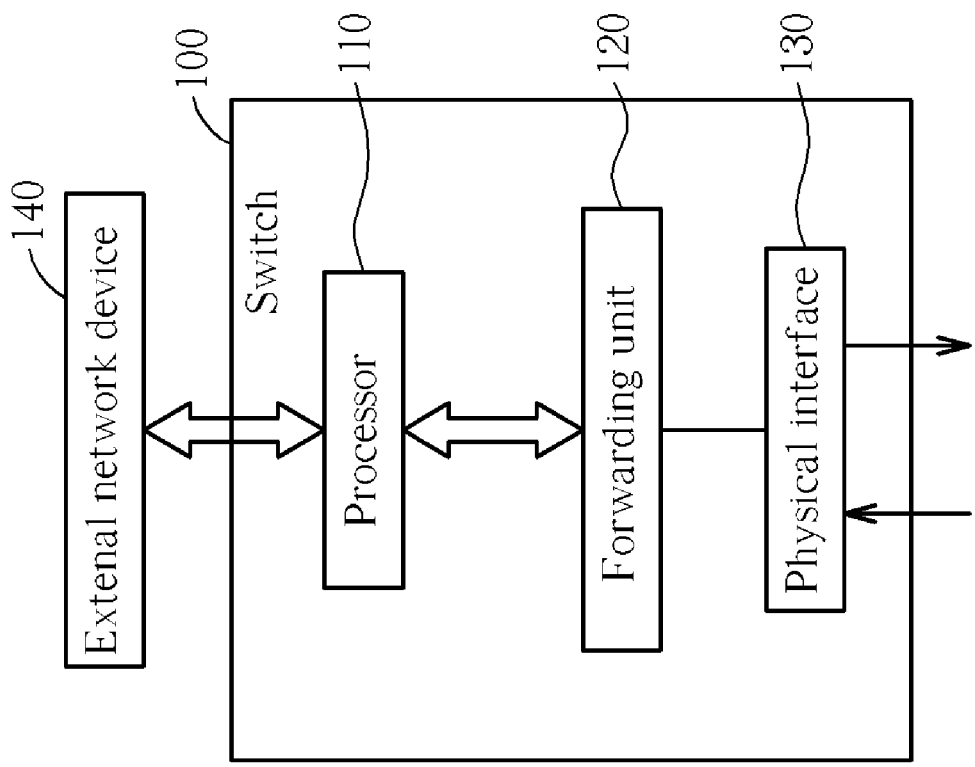
FIG. 1 is a diagram of a conventional switch.
Figure 2:
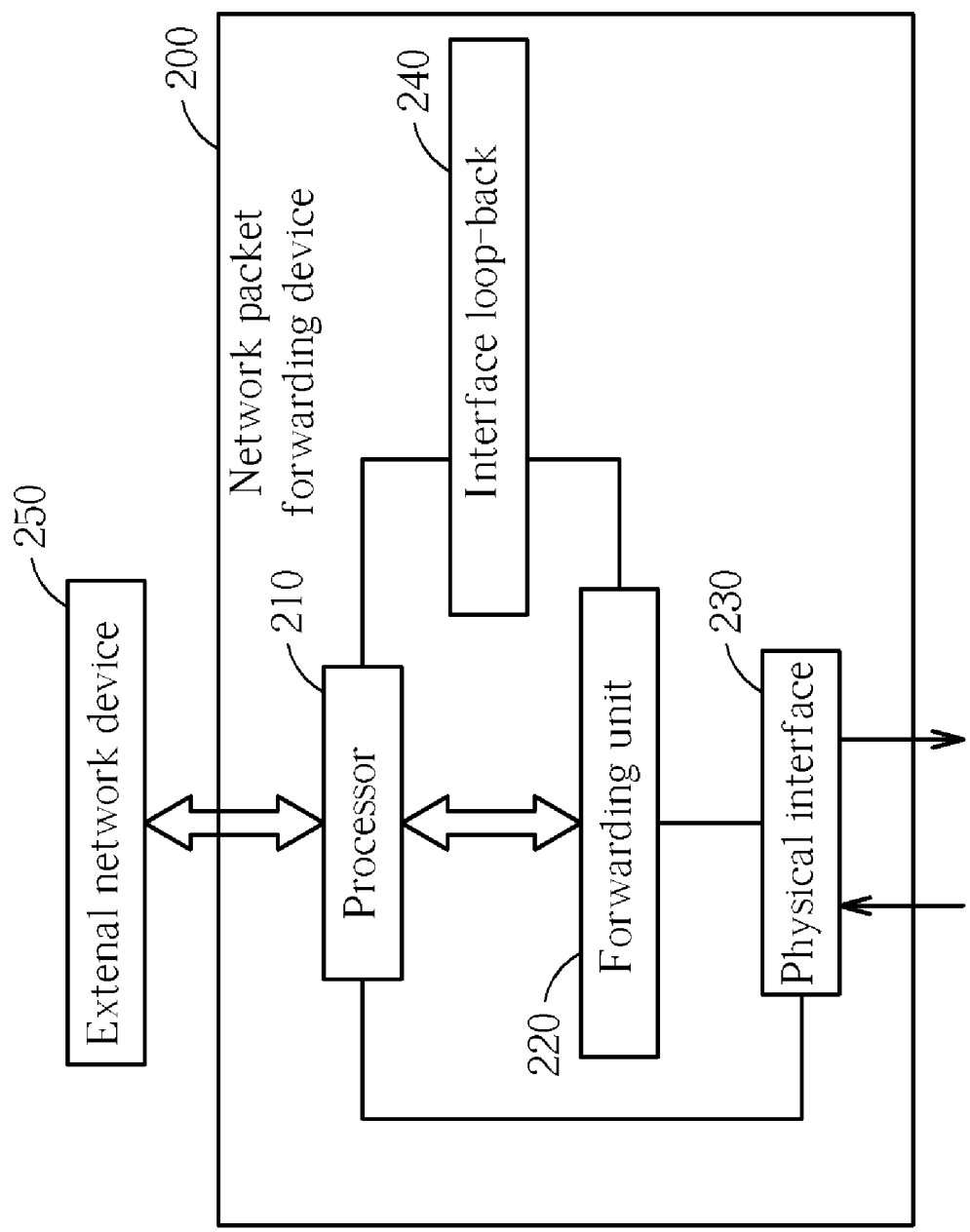
FIG. 2 is a diagram of a network packet forwarding device according to the present invention.

Please refer to FIG. 2, which is a diagram of a network packet forwarding device 200 according to the present invention. As shown in FIG. 2, the network packet forwarding device 200 (such as switch, router, gateway) comprises a processor 210, coupled to an external network device 250; a forwarding unit 220; a plurality of physical interfaces 230; and an interface loop-back 240. In an embodiment, the processor 210 can be a CPU, and the forwarding unit 220 can be an ASIC. The processor 210 is coupled to the forwarding unit 220 through a bus. In an embodiment, the physical interface 230 comprises at least one media independence interface (MII) and a physical layer circuit (PHY) complying with IEEE 802.3 specifications. In another embodiment, the physical interface 230 comprises at least one MII and at least one fiber transceiver. In general, the forwarding unit 220 comprises a controller, and a media access control (MAC) circuit. In one embodiment, interfaces of the processor 210 and the external network device 250 can be PCMCIA, USB, PCI, PCI-EXPRESS, or other familiar interfaces.

As known by those skilled in the art, there is an MII in a normal switch, comprising a plurality of receivers (Rx) and a plurality of transmitters (Tx). In this embodiment, the interface loop-back 240 is implemented by the MII. That is, the interface loop-back 240 is the MII loop. A receiver of the MII is connected to a transmitter of the MII in this embodiment. Therefore, when the transmitter outputs a packet, the receiver of the MII receives the packet outputted from the transmitter of the MII. For example, in this embodiment, the processor 210 can transfer packets through the transmitter of the MII, so the forwarding unit 220 can simultaneously receive the packet from the MII loop. In one embodiment, the processor 210, the forwarding unit 220, and the interface (e.g. MII) of the interface loop-back 240 are located inside an IC, and the connecting wire connected between the receiver of the MII and the transmitter of the MII is located outside the IC.

The interface loop-back 240 can also be implemented by other interfaces (for example, GMII, SERDES, RMII, RGMII, SMII, SSMII, and any other interfaces between the MAC and PHY defined by other IC design companies). During the stage of designing the IC, a specific circuit can be designed inside the IC in the MAC of the forwarding unit 220, for supporting the aforementioned loop-back mechanism. In this embodiment, the processor 210, the forwarding unit 220, and the interface loop-back 240 are located inside the IC. That is, the connecting wire connected between the receiver of the MII and the transmitter of the MII is located inside the IC.

Two packet forwarding methods will be disclosed to illustrate the operations of forwarding packets of the network packet forwarding device 200 according to the present invention.

Figure 3:
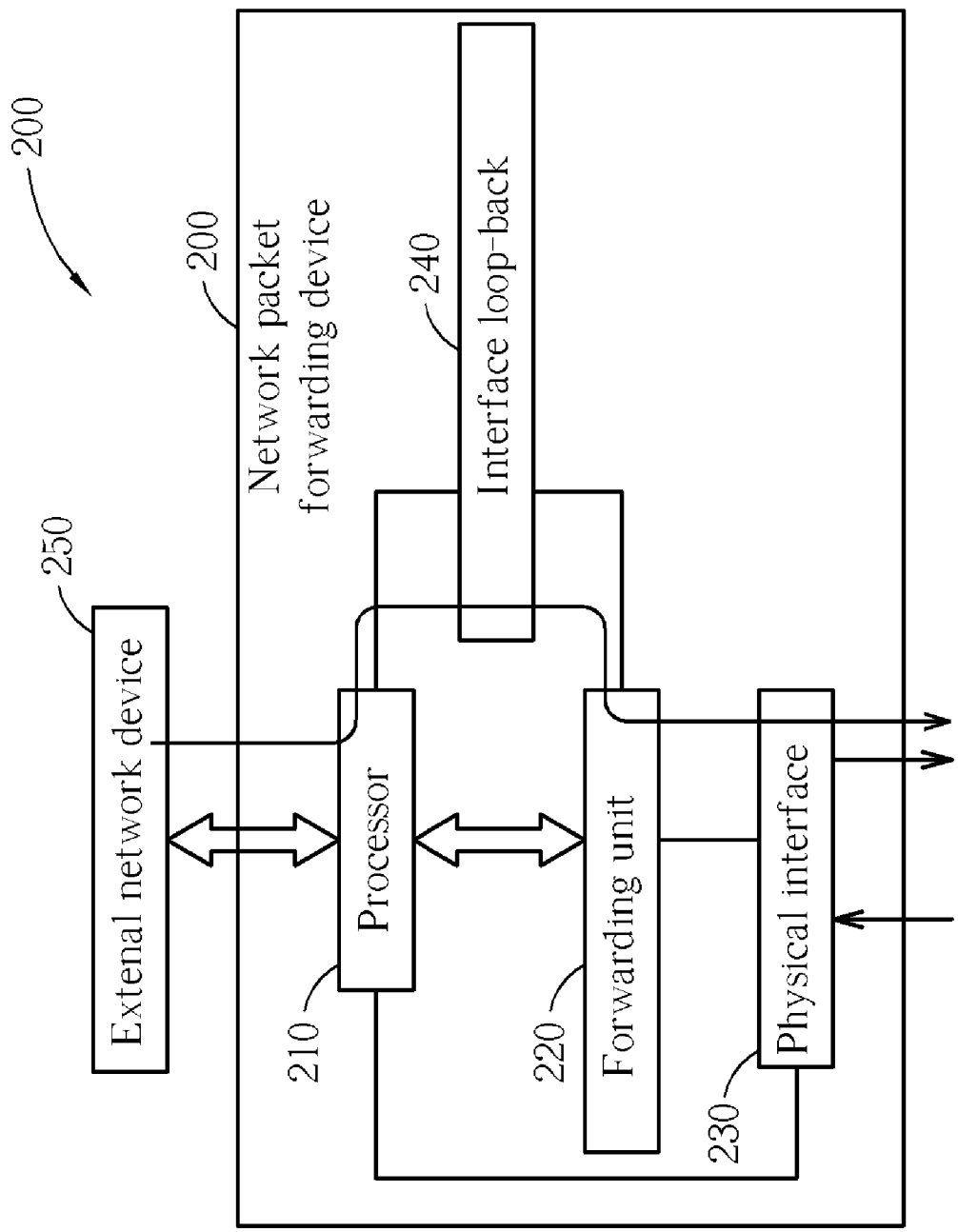
FIG. 3 is a diagram forwarding packets to the physical interface of a first embodiment according to the present invention.

FIG. 3 illustrates the external network device 250 forwarding packets to the physical interface 230 according to the present invention. The arrow shows the route of the packets. When the processor 210 receives a wireless network packet from the external network device 250, the packet is first processed by the forwarding unit 220 in this embodiment. This is because it wastes a lot of system resources to completely utilize the processor 210 and related software to deal with the wireless network packet.

In one embodiment, the packet from the external network device 250 complies with the wireless network specifications (that is, the packet complies with the 802.11 format), so the processor 210 has to first process the packet to transform the format of the packet into a format complying with Ethernet format (802.3 format). In another embodiment, the packet has been transformed into the 802.3 format by the wireless network device 250, so the processor 210 can directly receive the packet complying with the 802.3 format, and does not have to perform the above-mentioned format transformation.

Figure 4:
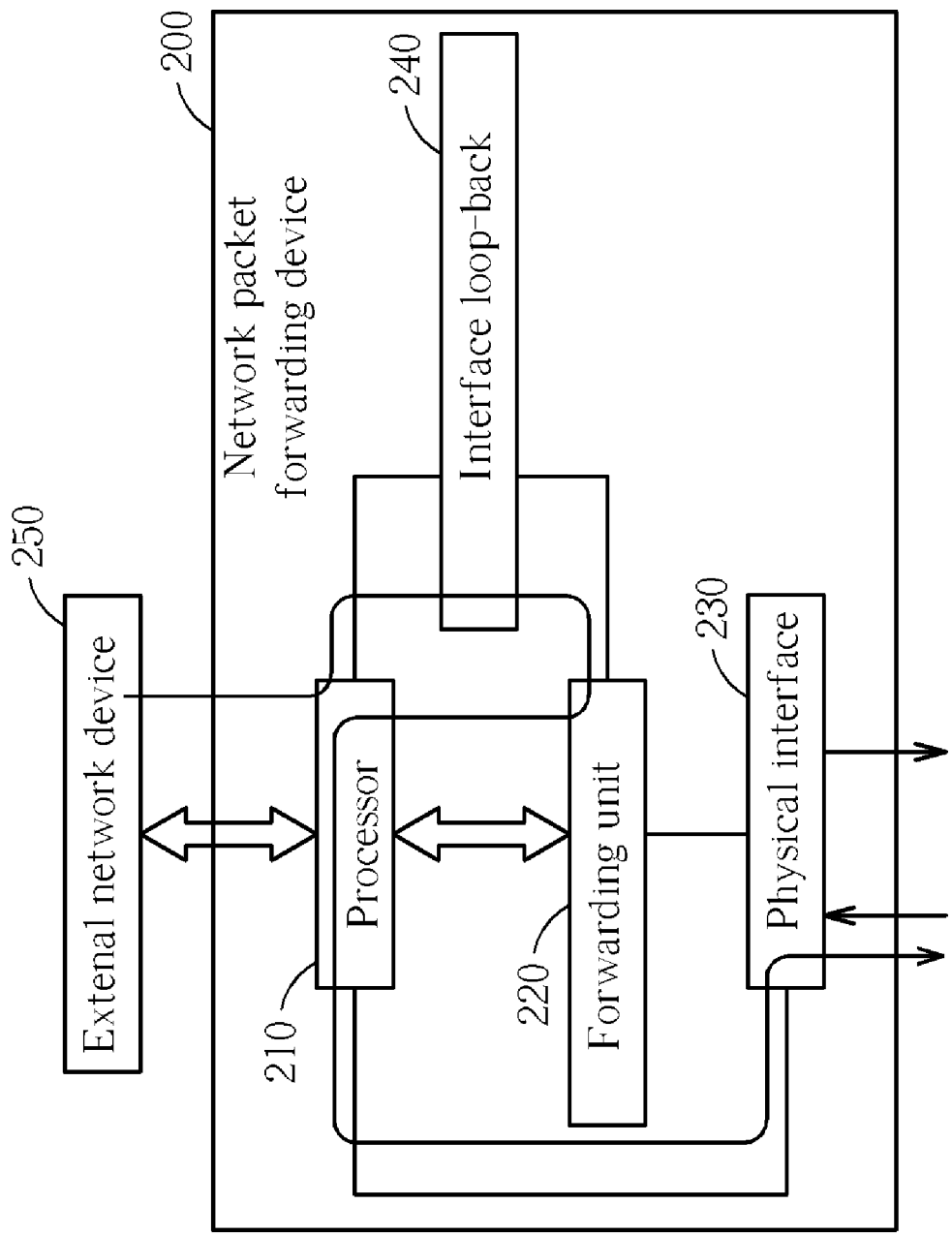
FIG. 4 is a diagram forwarding packets to the physical interface of a second embodiment according to the present invention.

In this embodiment, the processor 210 outputs the packet to the interface loop-back 240 after receiving the packet. This means the forwarding unit 220 can receive the packet through the interface loop-back 240. If the forwarding unit 220 can completely process the packet, the forwarding unit 220 can correctly forward the packet to a correct physical interface according to a destination address of the packet. On the other hand, if the forwarding unit 220 cannot completely process the packet, another method must be utilized. Please refer to FIG. 4, which is a diagram illustrating the external network device forwarding packets to the physical interface of a second embodiment according to the present invention. Because the forwarding unit 220 cannot completely process the packet, the forwarding unit 220 traps the packet to the processor 210 after receiving the packet, which then processes the packet. In a normal switch, the processor 210 has been coupled to the physical interface 230, and is capable of transferring the packet to physical interfaces 230. Therefore, in this embodiment, the processor 210 outputs the processed packet to correct physical interface 230 according to the destination address of the packet.

Figure 5:
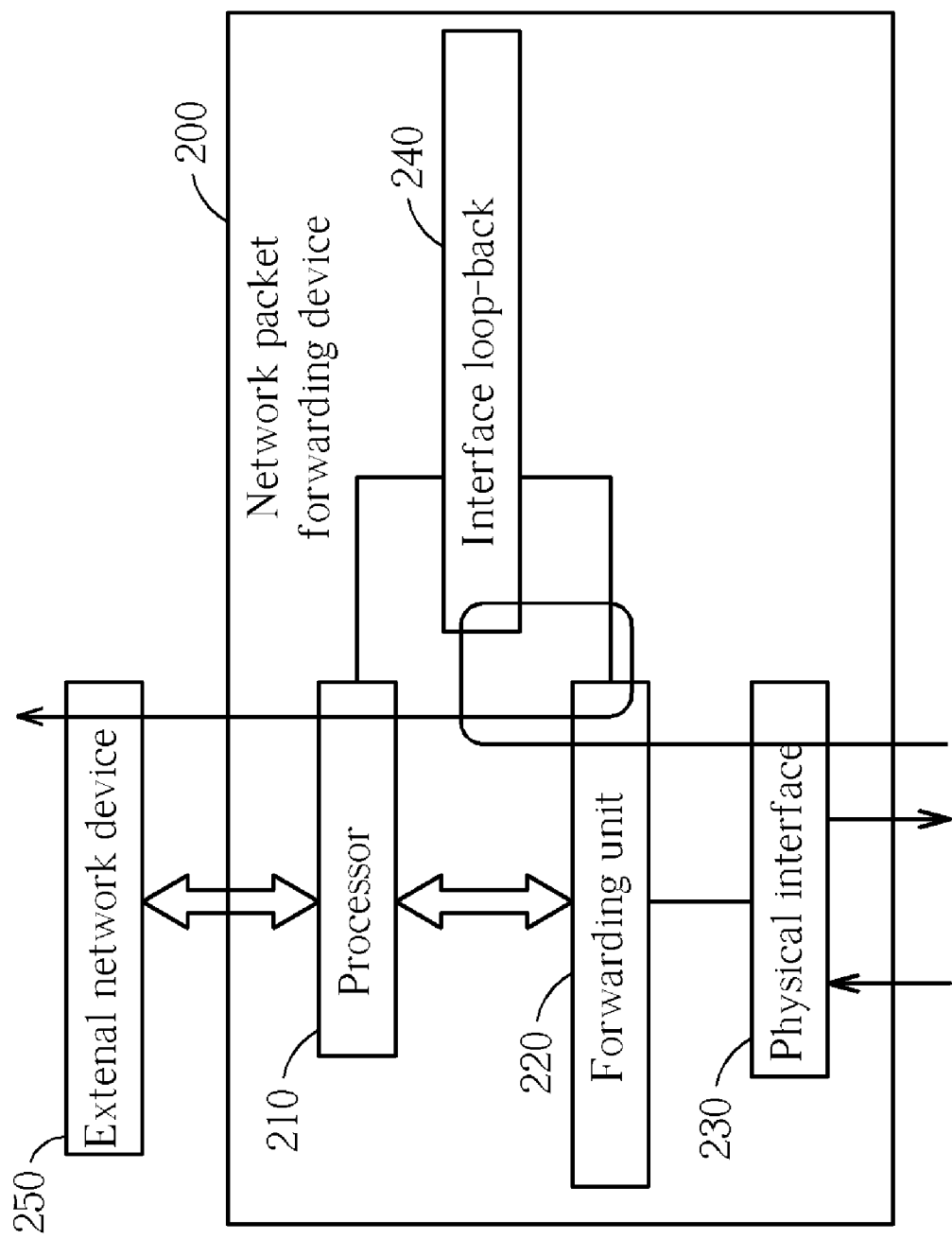
FIG. 5 is a diagram forwarding a packet to the external network device according to the present invention.

Please refer to FIG. 5, which is a diagram illustrating the physical interface 230 forwarding a packet to the external network device 250 according to the present invention. The arrow shows the route of forwarding the packet. When receiving a packet to be forwarded to the external network device 250, the forwarding unit 220 first processes the packet.

As mentioned previously, the packet from the external network device 250 is transferred to the forwarding unit 220 through the interface loop-back 240. Therefore, the forwarding unit 220 naturally first outputs the packet to be forwarded to the external network device 250 to the interface loop-back 240, and writes its MAC address into a source address of the packet. Due to the MII loop of the interface loop-back 240, the forwarding unit 220 will receive the outputted packet again.

If the forwarding unit 220 determines that the source address of a certain packet is its MAC address, the forwarding unit 220 traps the packet to the processor 210 through the bus. As known by those skilled in the art, in the process of forwarding the packet, the forwarding unit 220 usually has to check an access control list (ACL) such that the packet forwarding path could be determined. In this embodiment, the present invention adds a new rule to the ACL such that the forwarding unit 220 can trap the packet to the processor 210 if the source MAC address complies with the MAC address of the forwarding unit 220. The related operation of adding new rules to ACL is well known, and further detailed illustration is therefore omitted here.

After the processor 210 receives the packet, the present invention processor 210 also checks the source address of the packet to see if the source address complies with the MAC address of the forwarding unit 220. If the source address complies with the MAC address of the forwarding unit 220, the processor 210 can understand that the packet has been processed by the forwarding unit 220 and needs to be forwarded to the wireless network device 250. Therefore, the processor 210 processes the packet and outputs the processed packet to the wireless network device 250.

As mentioned previously, the processor 210 may need to transform the format of the packet to make the packet comply with the wireless network specification (the 802.11 standard). Alternatively, the processor 210 can directly output the packet to the wireless network device 250, and as mentioned previously, the wireless network device 250 will handle the format transformation.

In the following disclosure, an example is disclosed to further illustrate the present invention. The forwarding device 220 can support corresponding operations of NAPT (Network Address-Part Translation) in a normal switch. In recent applications, however, when the packet is transferred from a network (the above-mentioned physical interface 230) to the wireless network end (the above-mentioned wireless network device 250), the virtual personal network (VPN) application of PPTP/L2TP may be needed. The network packet forwarding device 200 has to also add a PPTP/L2TP header to the packet for the original NAPT operation. The present invention therefore utilizes the interface loop-back mechanism to ensure the forwarding unit 220 can first process the original NAPT operation, and then transfer the packet to the interface loop-back, such that the processor 210 can add the PPTP/L2TP header to the packet. The processor 210 can then transfer the processed packet to the wireless network device 250 such that the packet forwarding work can be completed.

Please note that the above-mentioned wireless network device 250 is only utilized as an illustration, and not a limitation of the preset invention.

Figure 6:
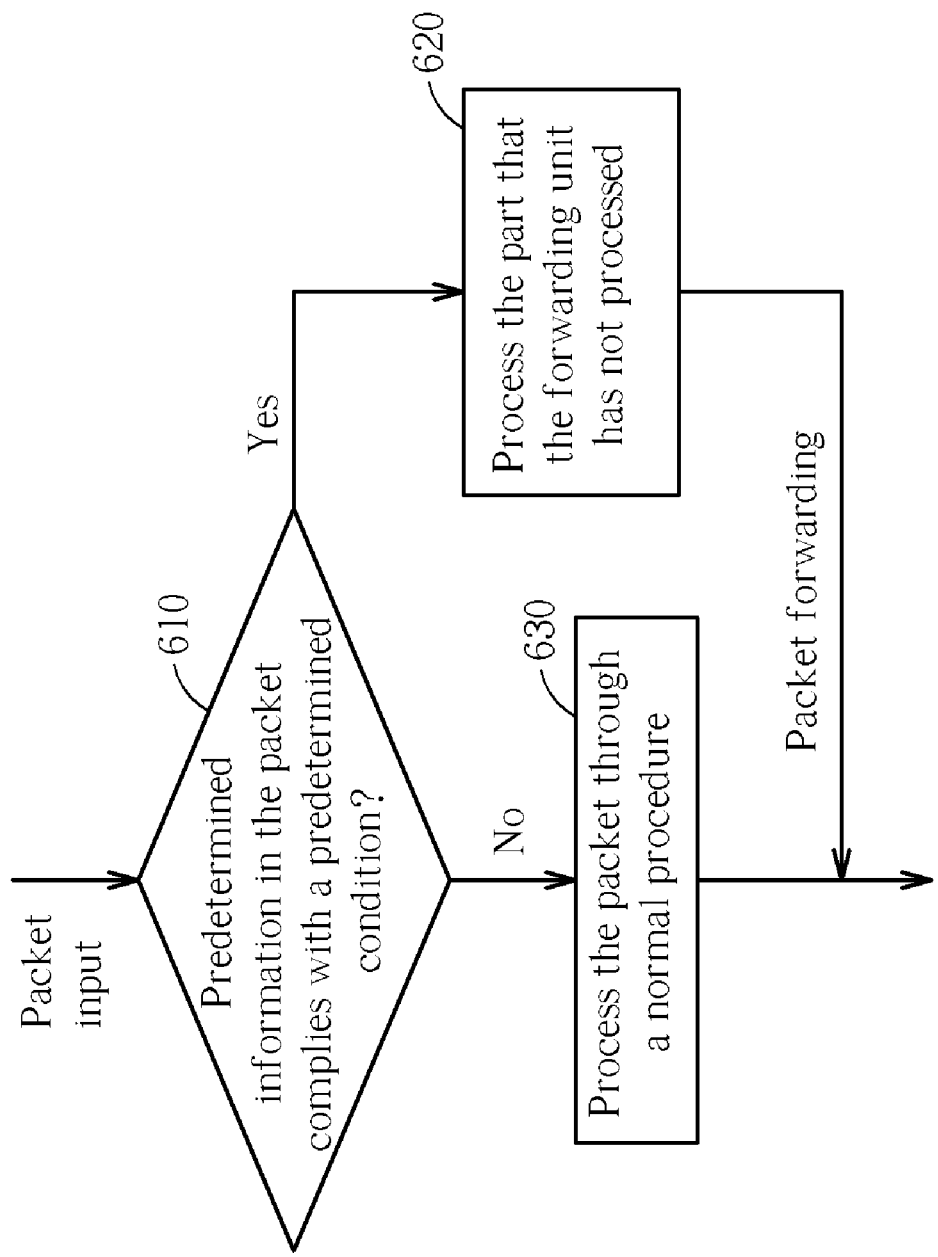
FIG. 6 is a simplified diagram of operations of the processor.

Please refer to FIG. 6, which is a simplified diagram of operations of the processor 210. As shown in FIG. 6, when receiving packets, the processor 210 first checks a predetermined information (step 610). If the predetermined information complies with a condition, the processor 210 can know that the packet has been processed through a forwarding unit 220, and the processor 210 only has to process the part that the forwarding unit 220 has not processed yet (step 620). On the other hand, if the predetermined information does not comply with the condition, the processor 210 can directly utilize conventional packet processing procedure to deal with the packet (step 630) such that the packet can be forwarded.

Please note that the above-mentioned method of modifying the source address is only utilized as a preferred embodiment, and not a limitation of the present invention. In the actual implementation, the present invention can add some additional information to the packet, instead of modifying the source address, in order to show that the packet has been processed. This can also achieve the goal of utilizing the processor and the forwarding unit to process the packet together.

In the above disclosure, the source address is utilized to determine whether the packet has been processed by the forwarding unit 220. Therefore, the forwarding unit 220 has the ability of modifying the source address. The operation of modifying the source address is simple for those skilled in the art. In addition, although the present invention modifies the source MAC address, the source IP address is not modified. This means the source of the packet can also be determined so that the transmission of the packet is not influenced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for forwarding packet comprising:
   a transmission interface, configured to couple to a first network device;
   a loop;
   a processing unit, coupled to the loop, for receiving a packet and outputting the packet to the loop;
   a forwarding unit, coupled between the transmission interface and the processing unit and further coupled to the loop, for receiving the packet from the loop and forwarding the packet received from the loop to the first network device through the transmission interface; and
   wherein when the forwarding unit is not capable of forwarding the packet received from the loop, the forwarding unit:
   outputs the packet to the loop,
   receives the outputted packet from the loop,
   traps the packet received from the loop to the processing unit through a bus, and
   the processing unit processes the packet from the forwarding unit and outputs the processed packet to the first network device.

2. The apparatus of claim 1, wherein the transmission interface lies in a media access control (MAC) of the forwarding unit.

3. The apparatus of claim 1, wherein the loop comprises an interface including a transmitter and a receiver, and the transmitter is coupled to the receiver.

4. The apparatus of claim 3, wherein the interface is coupled between a media access control (MAC) and a physical circuit (PHY) of the forwarding unit.

5. The apparatus of claim 1, wherein the first network device is an Ethernet network device, a second network device is coupled to the processing unit and is a wireless network device, and the processing unit processes the packet to transform a format of the packet from a wireless network format into an Ethernet format.

6. The apparatus of claim 1 wherein the processing unit receives and processes the packet, and outputs the processed packet to a second network device.

7. The apparatus of claim 1, wherein the forwarding unit replaces a MAC address of the packet with the MAC address of the forwarding unit.

8. A method for forwarding packet comprising:
   providing a loop;
   utilizing a processing unit to receive a packet from a first network device, and outputting the packet to the loop;
   utilizing a forwarding unit to receive the packet from the loop;
   when the forwarding unit is capable of forwarding the packet received from the loop, forwarding the packet from the forwarding unit to a second network device through a transmission interface;
   when the forwarding unit is not capable of forwarding the packet received from the loop, outputting the packet from the forwarding unit to the loop, receiving the outputted packet in the forwarding unit from the loop, trapping the packet received from the loop to the processing unit through a bus; and
   utilizing the processing unit to process the packet from the forwarding unit and output the processed packet to the second network device through the transmission interface.

9. The method of claim 8, wherein the first network device is a wireless network device, the second network device is an Ethernet network device, and the method further comprises: converting a wireless network format of the packet into an Ethernet format of the packet.

10. The method of claim 8, wherein the forwarding unit writes an address of the forwarding unit into a source address of the packet before outputting the packet to the loop when the forwarding unit is not capable of forwarding the packet received from the loop.

11. The method of claim 10, wherein the forwarding unit traps the packet received from the loop by determining that the source address of the packet matches the address of the forwarding unit.

12. The method of claim 10, wherein the forwarding unit traps the packet received from the loop by determining that the source address of the packet matches a rule in an access control list.

* * * * *